United States Patent [19]

Marchesini

[11] Patent Number: 5,135,383
[45] Date of Patent: Aug. 4, 1992

[54] EQUIPMENT FOR THERMOFORMING POLYPROPYLENE BANDS

[76] Inventor: Massimo Marchesini, Via S. Bartolomeo 17, Pianoro (Bologna), Italy

[21] Appl. No.: 630,515

[22] Filed: Dec. 20, 1990

[30] Foreign Application Priority Data

Dec. 29, 1989 [IT] Italy .................. 3794 A/89

[51] Int. Cl.⁵ ................................ B29C 51/00
[52] U.S. Cl. ................... 425/387.1; 425/394; 425/397; 425/398; 425/403.1
[58] Field of Search ............ 425/383, 384, 385, 387.1, 425/394, 395, 397, 398, 399, 403, 403.1, 423

[56] References Cited

U.S. PATENT DOCUMENTS

| 3,518,334 | 6/1970 | Carrigan et al. | 425/397 |
| 4,009,981 | 3/1977 | Rosen | 425/384 |
| 4,105,386 | 8/1978 | Thiel et al. | 425/387.1 |
| 4,360,491 | 11/1982 | Holden, Jr. | 425/398 |
| 4,758,145 | 7/1988 | Hautemont | 425/398 |
| 4,844,852 | 7/1989 | Keyser et al. | 425/397 |

FOREIGN PATENT DOCUMENTS 56-67245  6/1981  Japan ................ 425/397

Primary Examiner—Jay H. Woo
Assistant Examiner—Scott Bushey
Attorney, Agent, or Firm—Darby & Darby

[57] ABSTRACT

An apparatus for thermoforming a polypropylene band by heating plates located upstream of a pressing station where transverse rows of blisters are made on a band by a die. A striker device is located at the outlet of the pressing station and is operated in phase relationship with the advancement of the band, after every pressing stage. A plurality of pins, which are borne by a movable bar, are moved towards the band to intercept, when the die is closed, a transverse row of blisters of the band, and to prevent any sliding of a portion of the band still to be formed.

7 Claims, 6 Drawing Sheets

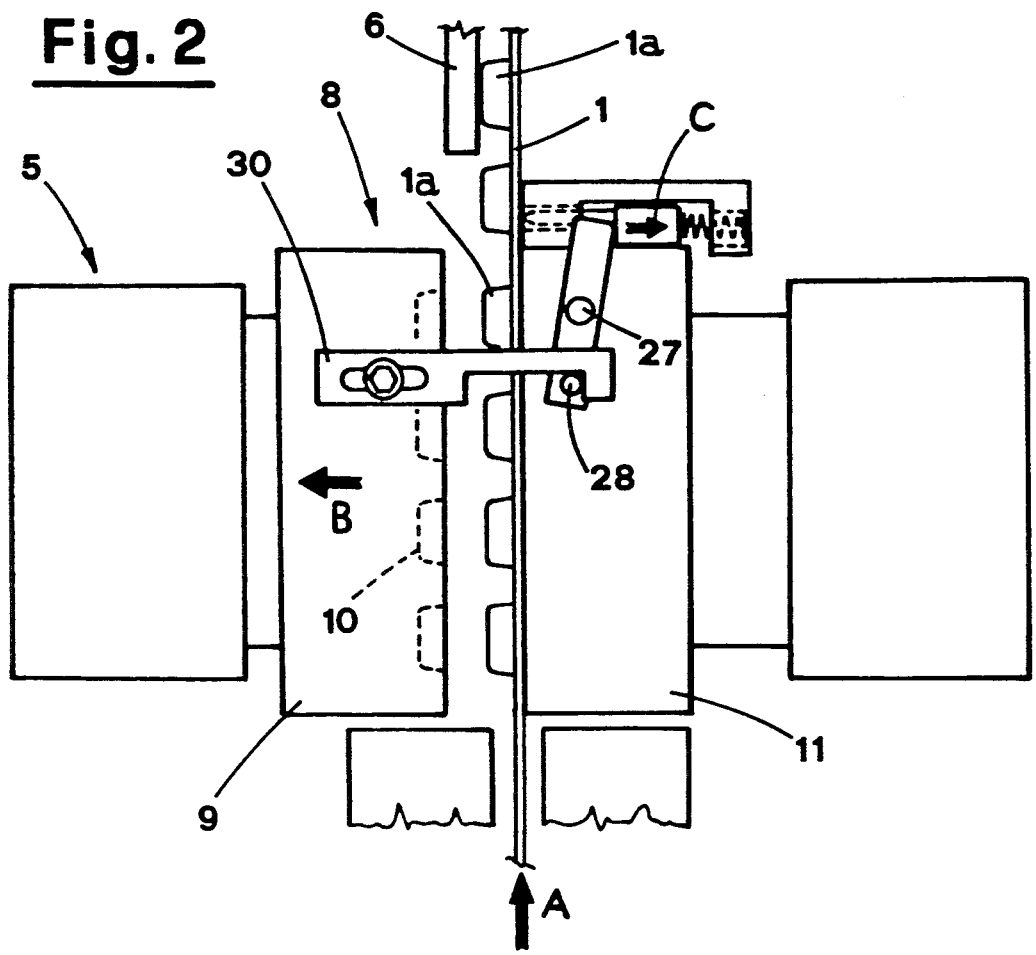

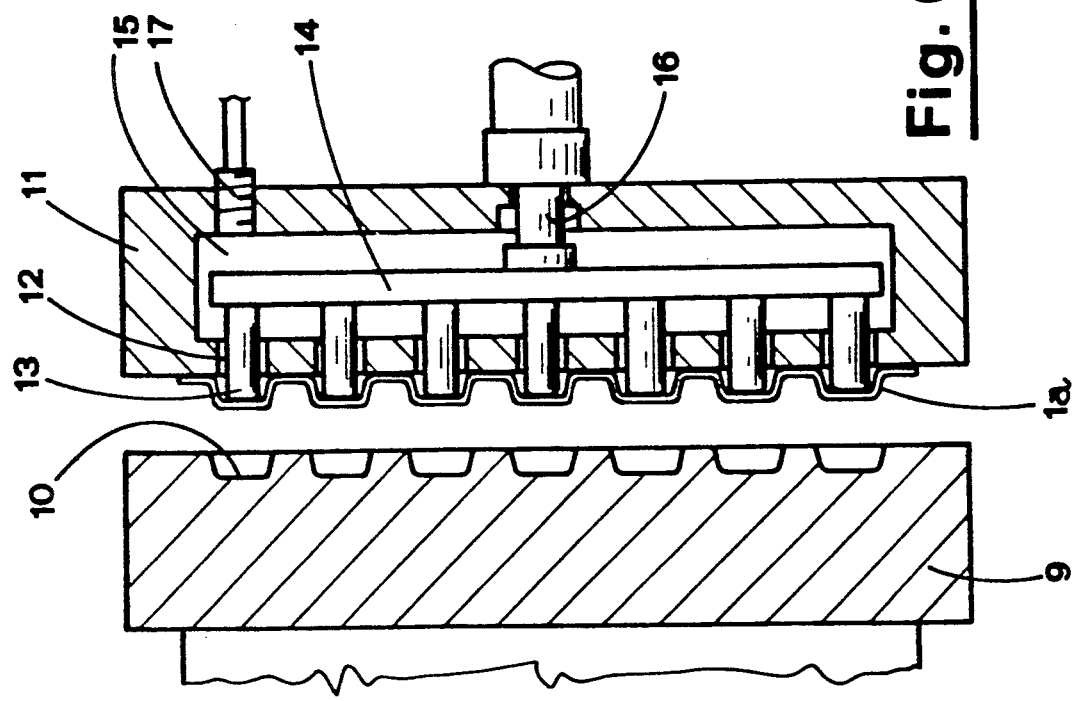
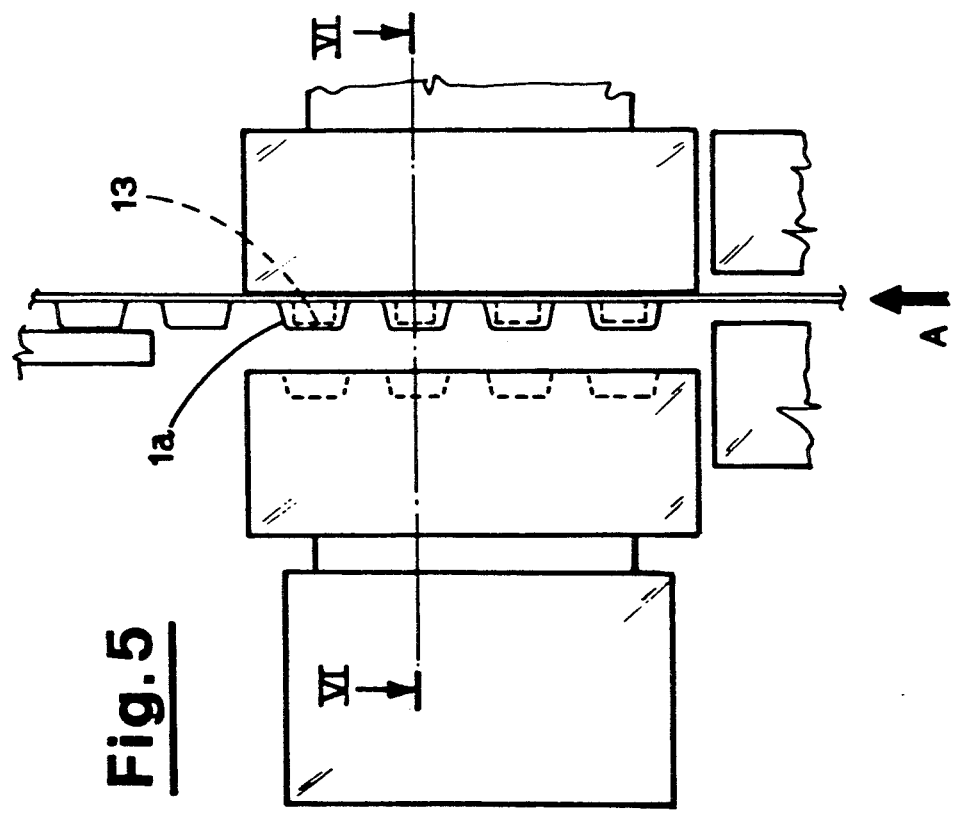

EQUIPMENT FOR THERMOFORMING POLYPROPYLENE BANDS

BACKGROUND OF THE INVENTION

This invention relates to the technical field concerning the thermoforming of polypropylene bands.

DESCRIPTION OF THE PRIOR ART

Various types of automatic equipment are known, for making parallel rows of blisters on a band of thermoformable material. The blisters are suited to contain various items, particularly medicinal preparations, like capsules, pills, tablets, and the like. The blister band shall later be closed with a film of heat-sealing material, and subdivided into a plurality of equal portions, commonly called blister packs.

PVC bands and the like have been used to make blister packs for quite a long time. At the present time, however, the use of polypropylene bands is in great demand, owing to the better biodegradability of that material.

These types of equipment usually provide for band pre-heating means; a pressing station where the formation of blisters on the band is carried out; and pulling means suited to actuate the advancement in step of the band.

The pressing station usually features a movable plate and a stationary plate cooperating together to form the blisters; such plates feature respectively a series of hollows having a shape complementary with the blisters to be formed and a corresponding series of holes, coaxial to said hollows, through which compressed air is blown in.

The thermoforming of the band is carried out by clamping the band between the die plates, and subsequently blowing compressed air into said hollows through the holes of the stationary plate.

In the equipment mentioned above, the need arises to keep constant the step of advancement of the band after every pressing stage, in such a way as to ensure that the transverse rows of blisters are equally spaced from each other.

This turns out to be particularly difficult with the polypropylene bands, since this material shows a remarkable shrinkage in the cooling phase. In fact, at the outlet of the pressing station the cooling of the band causes a traction on the portion of the same band which is about to undergo the action of the die plates, and consequently the distance between the two series of blisters is changed.

Such a drawback is made even more serious by the features of low isotropy of the material, which may involve, among other things, substantial differences in behaviour among different coils of band.

The problem concerning the regularity of distance among the rows of blisters also arises when the operation of the equipment is started again after a stop of any nature.

In fact, this may often cause a displacement of the band, if it is not held properly. However, the safety regulations in force do not allow to keep the die plates clamped, in order to keep the band in position, owing to the very high clamping pressure.

SUMMARY OF THE INVENTION

The object of the invention is to propose an equipment which makes it possible to keep perfectly constant the distance among the blister rows in the thermoforming of polypropylene bands, both during the normal operation and at the moment of starting again after a stop.

A further object of this invention is to propose an equipment for the thermoforming of polypropylene bands which can be realized through a technical solution which turns out to be simple, functional, and reliable, as well as versatile.

The objects mentioned above are accomplished through an improved equipment for the thermoforming of polypropylene bands, comprising: means for pre-heating the band; a pressing station provided with a die made up of a movable plate, featuring a series of hollows having a shape complementary with the blisters to be formed on said band, and a stationary plate featuring a series of holes, respectively coaxial with said hollows, through which compressed air is blown in to form, in cooperation with said hollows, transverse rows of said blisters on said band; pulling means suited to cause the advancement in step of the thermoformed band, characterized in that it comprises a striker device located at the outlet of said pressing station and operated in a suitable phase relationship with the advancement in step of said band after every pressing stage, with this striker device comprising a plurality of pins which are borne by a bar movable on a plane transverse to the band and which are suited to intercept, when said die is closed, a transverse row of blisters of the thermoformed band, so to prevent any sliding of the portion of band still to be formed.

BRIEF DESCRIPTION OF THE DRAWINGS

The features of this invention, not emerging from what has been said above, are pointed out here below, with a particular reference to the drawings enclosed herewith, where:

FIG. 2 shows a side view of the pressing station being a part of the equipment;

FIG. 3 shows a detailed view of said striker device;

FIG. 5 shows a side view of said die with the equipment stopped;

FIG. 6 shows a cross-section view according to the line VI—VI of FIG. 5;

DESCRIPTION OF THE PREFERRED EMBODIMENT

Figure 1:
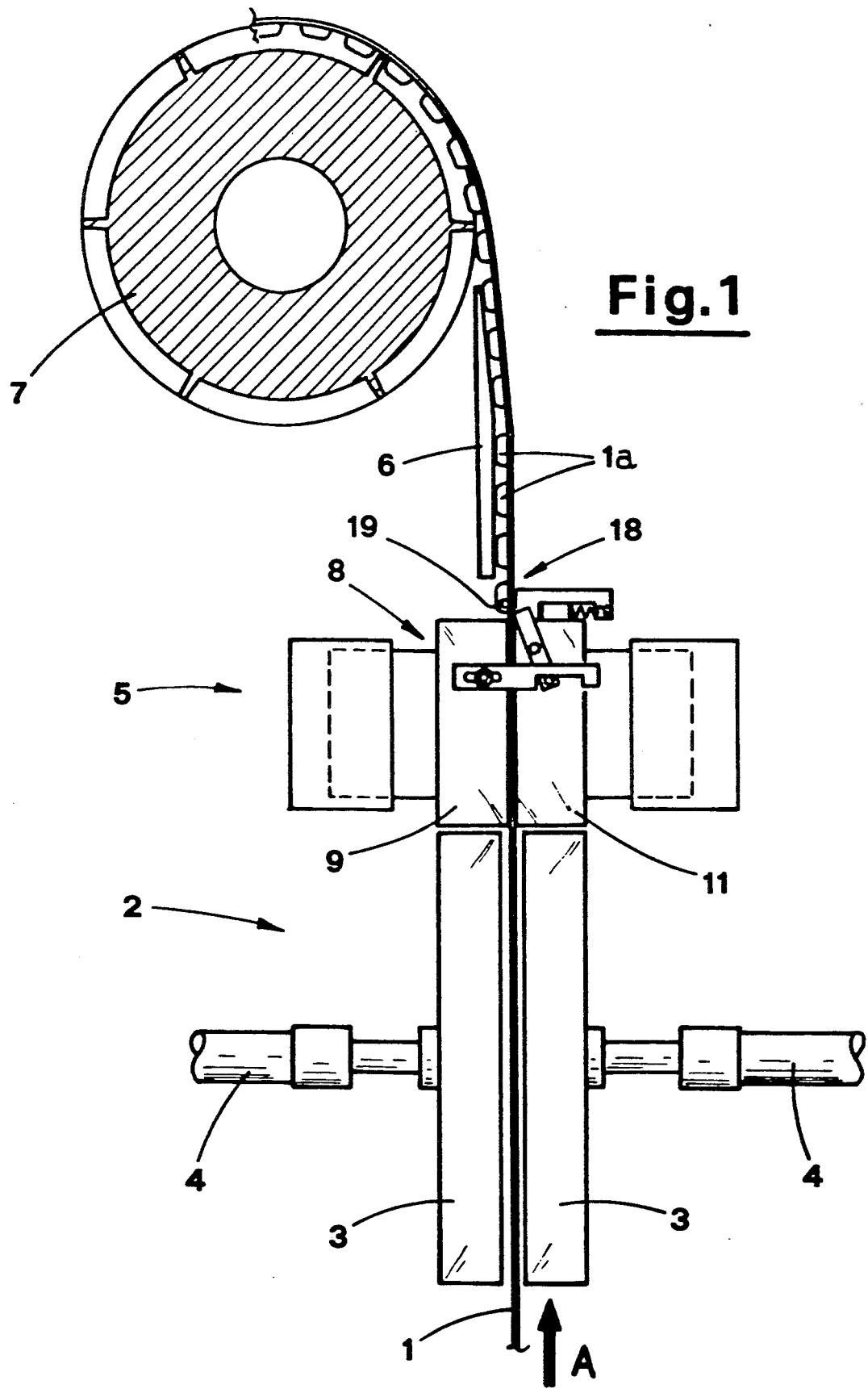
FIG. 1 shows a side view of the equipment for the thermoforming of polypropylene bands which is the subject of this invention.
Figure 4:
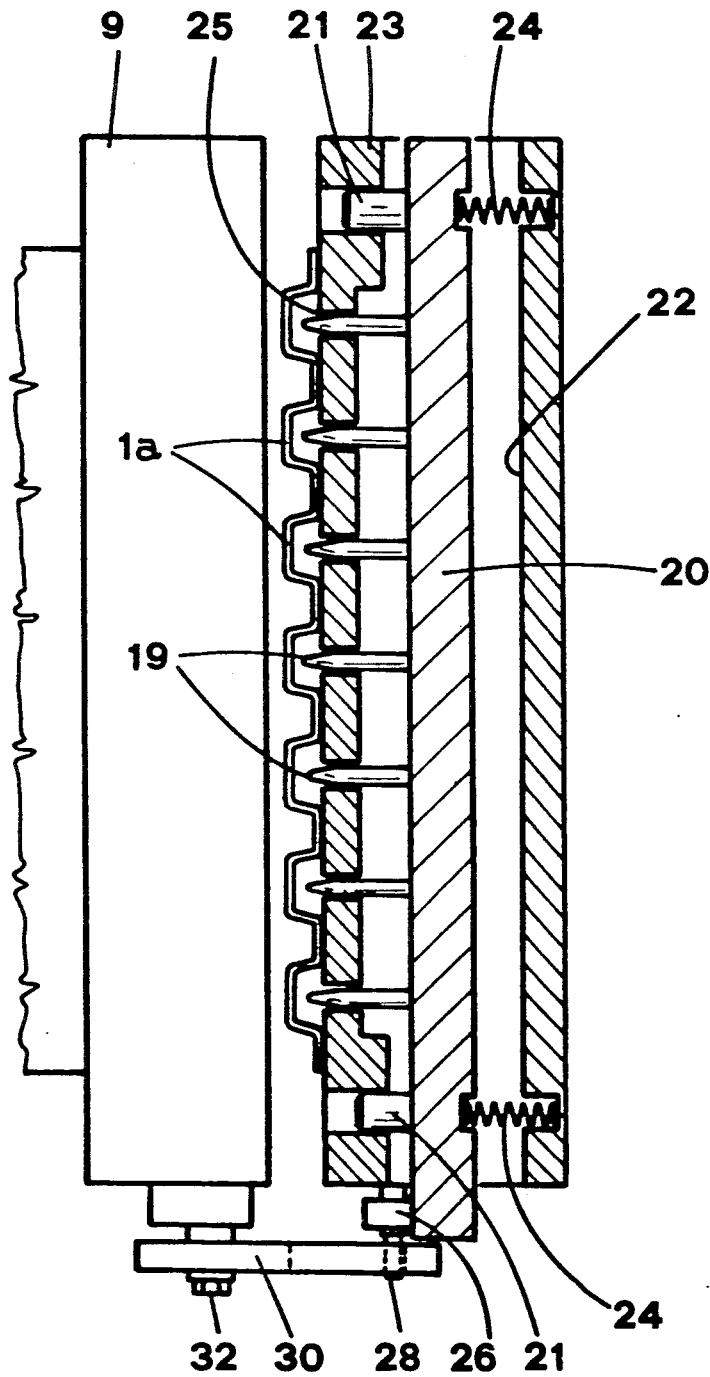
FIG. 4 shows a sectional view according to the line IV—IV of FIG. 3.

With reference to the above-mentioned figures, the equipment for the thermoforming of polypropylene bands comprises means for pre-heating the band 1, generically indicated by 2. Such pre-heating means 2 feature a pair of heating plates 3 suited to be closed onto the band 1 by the action of respective jacks 4.

Downstream of the pre-heating means 2, in the direction of advancement A, a pressing station 5 is located, designed to form rows of blisters 1a on the band 1. At the outlet of the pressing station 5 the blister band, guided by a stationary striker 6, winds round a pulling means 7 suited to control the advancement in step of the same band. The pulling means 7 is suited to revolve in a suitable phase relationship with the previous phases of pre-heating and pressing of the band 1.

The pressing station 5 is provided with a die 8 made up of a movable plate 9, featuring a series of hollows 10 having a shape complementary with the blisters 1a to be formed on the band 1, and a stationary plate 11, from which a corresponding series of strikers 13 are suited to protrude, through respective holes 12.

The hollows 10 and the corresponding holes 12 are disposed so to form, according to well-known techniques, a plurality of blister rows 1a transverse to the band 1.

The strikers 13 are borne by a plate or bar 14 movable inside a chamber 15 formed by the stationary plate 11 of the die; the movable plate 14 is operated by a jack 16 in a direction transverse to the plates themselves.

In the chamber 15 also a duct 17 has its outlet, conveying a jet of compressed air having the purpose to carry out, in a way known in itself, the complete forming of the blisters 1a.

At the outlet of the pressing station 5 there is located a striker device 18 suited to keep constant the distance among the transverse rows of blisters 1a when the band 1 is advanced in step after every pressing phase.

In substance, the device 18 provides a plurality of pins 19 borne by a bar 20 which is movable on a plane transverse to the band 1. The pins 19 correspond, in practice, to a transverse row of blisters 1a.

The bar 20 is guided through a pair of stems 21 inside a cavity 22 comprised in a support 23 integral with the stationary plate 11 of the die and it is subject to the action of two helical springs 24 housed in the same support 23. The pins 19 are suited to protrude through relative holes 25 from the support 23, so to intercept the last row of blisters made on the band 1, at the moment of closing the die 8 for forming a subsequent series of such blisters.

On the bar 20 is able to act an end of a rocking lever 26 which has centrally its fulcrum 27 on the stationary plate 11 of the die and bears, protruding at the other end, a pivot 28 which engages a guide cavity 29 made longitudinally on an arm 30 fastened to the movable plate 9. The arm 30 features a slot 31 which allows to regulate the position of the screw 32 for fastening to the movable plate 9.

Therefore, at the end of every pressing stage, the opening of the movable plate 9 of the die 8 is actuated, as indicated by the arrow B in FIG. 2. The moving of the movable plate 9 causes the revolving of the lever 26 pulled by the arm 30; the lever 26, in its turn, causes the movement of the bar 20 (arrow C), in contrast to the springs 24, so to cause the retraction of the pins 19 into the support 23. The band 1 is then caused to advance by a step by the pulling means 7.

Once the advancement of the band 1 is completed, the movable plate 9 of the die is caused to close, in the direction indicated by the arrow D in FIG. 3.

The movement of the plate 9 progressively releases the lever 26, allowing the return of the bar 20 under the thrust of the springs 24 (arrow E). Therefore the pins 19 come out of the support 23 and intercept the last row of blisters previously formed.

It is to be noticed that the pins 19 engage the side of the blisters 1a closest to the die 8, so that they act as strikers and prevent any shrinkings of the band in the portion already provided with the blisters from affecting the portion of the band still to be formed, by varying the distance among blister rows. In the case that the equipment operation is stopped, the strikers 13 are pushed into the blisters 1a just formed, and are left there while the die 8 is opened, as shown in FIGS. 5 and 6. Therefore, when the die is open, the band 1 cannot slide, in this way the distance among the blister rows is ensured to be kept constant when the operation is started again.

According to a variation of construction of the equipment described above, illustrated in FIG. 7, 8 and 9, the movable plate 9 is guided through a pair of stems 33 on a stationary frame 34 and it is controlled under pressure by a jack 35, integral with the same frame 34; the stem 35a of the jack 35 is able to strike against the movable plate 9.

The movable plate 9 is supported by a pair of auxiliary jacks 36, integral with the stationary frame 34.

Figure 7:
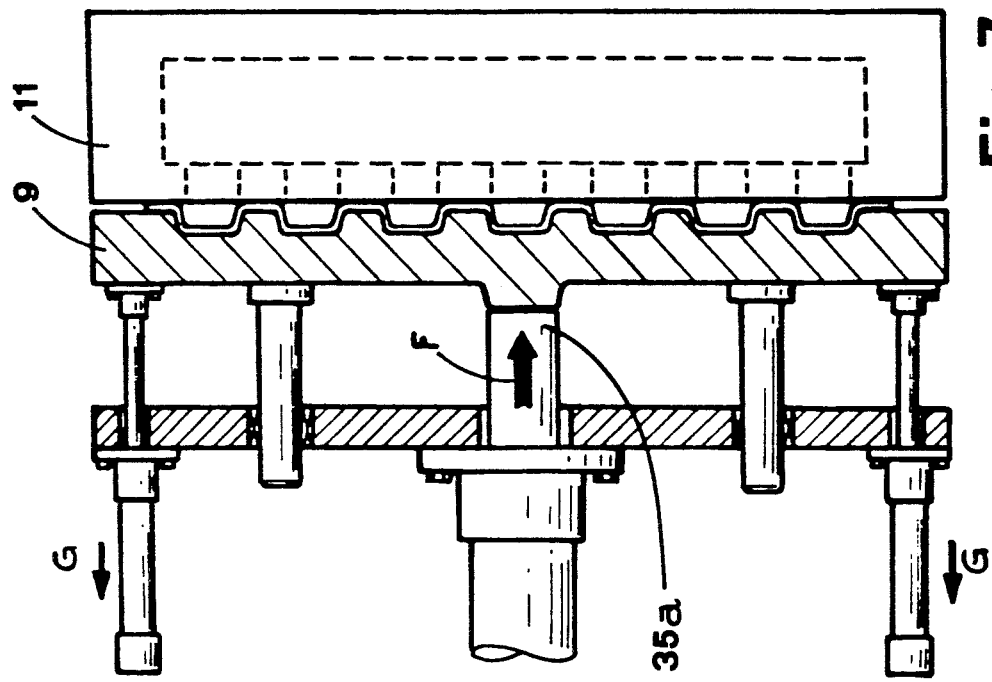
FIGS. 7, 8 and 9 show, in a cross-section view, a different form of construction of said die, respectively illustrated in a pressing phase, with the die open and with the equipment stopped.

During the normal operation of the equipment, the jack 35 supplies the pressure necessary for carrying out the pressing phase of the band 1; the stem 35a acts on the movable plate 9, as indicated by the arrow F in FIG. 7, while the auxiliary jacks 36 act in the opposite direction, so to keep the stem 35a elastically striking against the plate 9.

Figure 8:
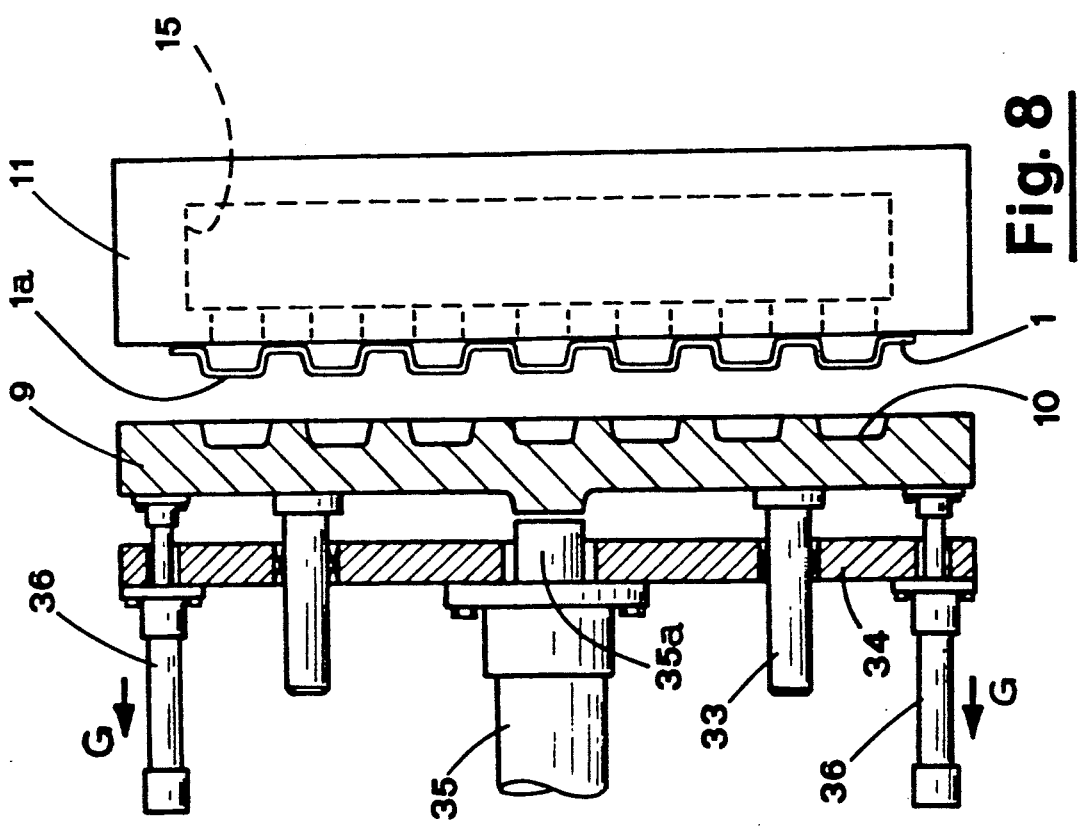

Furthermore, the auxiliary jacks 36 actuate the opening of the movable plate 9, after the thermoforming of the blisters 1a, as indicated by the arrow G in FIG. 8.

Figure 9:
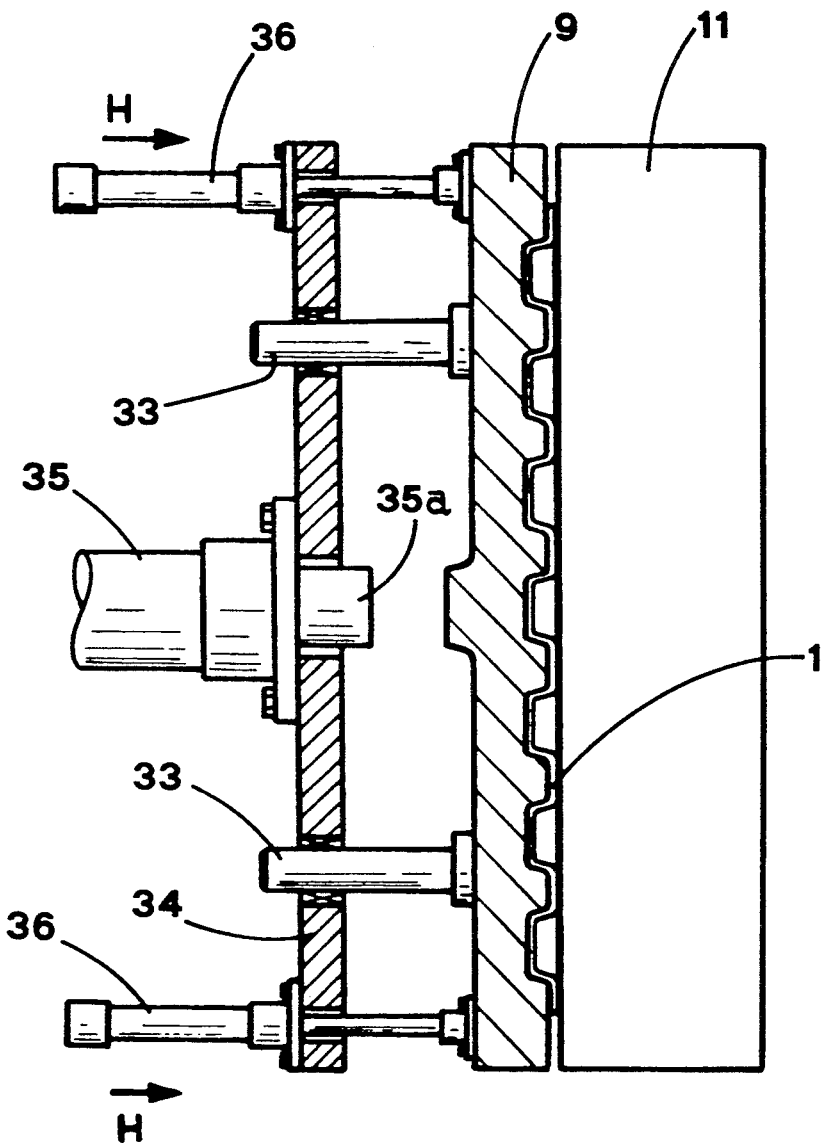

On the other hand, when the operation of the equipment is stopped, the auxiliary jacks 36 actuate the closure of the movable plate 9, as indicated by the arrow H in FIG. 9. In that case the die may be kept closed, with the equipment stopped, since the auxiliary jacks 36 operate at a low pressure, differently from the jack 35.

With the die closed any slidings of the band 1 are prevented, therefore, when the operation is started again, it is ensured that the distance among blister rows is kept constant.

The equipment being the subject of this invention allows, in short, to keep perfectly constant the distance among the rows of blisters 1a in the thermoforming of polypropylene bands, both during the normal operation and when the equipment is started after a stopping phase.

It is understood that the above has been described by way of example and it is not restrictive, therefore any variations of construction are understood as covered by the present technical solution, as described above and as claimed here below.

What is claimed is:

1. An apparatus for thermoforming a polypropylene band, comprising:
   means for preheating said band;
   a die for forming said preheated band at a pressing station, said die including a stationary plate having a plurality of holes and a movable plate including a plurality of hollows having shapes complementary with blisters to be formed on said band by operation of said die, said stationary plate and movable plate being opposed, with each said hollow being aligned with a respective one of said holes;
   means for moving said movable plate in a first direction toward said stationary plate and in a second direction away from said stationary plate;
   pressure means for flowing pressurized air through said holes, said air being directed toward said hollows;

advancing means for moving said band in steps from said means for preheating to said die and then from said die;

a striker device positioned at the outlet of said pressing station, said striker device including a first bar having a plurality of pins extended therefrom, and means for moving each said pin to respectively enter one of said formed blisters as said movable plate is moved in said first direction, said entered pins being positioned and dimensioned to prevent movement of said band before said movable plate has moved fully toward said stationary plate during operation of said apparatus, said means for moving said pins including a rocking lever pivoted on said stationary plate, and an arm fastened to said movable plate, said arm having a guide cavity, one end of said rocking lever acting on said bar having said pins, the other end of said lever being guided in said guide cavity, and spring means connected to said rocking lever for biasing said pins to extend into said blisters.

2. An apparatus as in claim 1, and further comprising a support integral with said stationary plate, said support having a cavity therein with openings in a wall of said cavity, said first bar being positioned within said cavity with said pins aligned to respective openings of said support, and spring means biasing said bar to cause said pins to extend through said openings.

3. An apparatus as in claim 1, wherein said holes and hollows are positioned to form at least one row of blisters in said band, said pins being positioned and spaced apart to enter a row of blisters already formed on a band, said entered blisters of said at least one row of blisters being closest to said die.

4. An apparatus as in claim 1, wherein said stationary plate has a chamber therein, a second bar being positioned within said chamber, said second bar having strikers respectively aligned to said holes in said stationary plate, said second bar being movable in a first direction to partially extend said strikers from said stationary plate and in a second direction to withdraw said strikers, whereby blisters formed in said band are entered by said extended strikers in operation of said apparatus.

5. An apparatus as in claim 1, further comprising a first jack having a stem for striking against said movable plate to move said movable plate in said first direction; and a pair of auxiliary jacks, said auxiliary jacks acting on said movable plate in a direction opposite to said first jack, simultaneous operation of said jacks when said movable plate is moved in said first direction effecting elastic striking of said stem against said movable plate, said auxiliary jacks moving said movable plate away from said stationary plate after thermoforming said blisters.

6. An apparatus for thermoforming a polypropylene band, comprising:

means for preheating said band;

a die for forming said preheated band at a pressing station, said die including a stationary plate having a plurality of holes and a movable plate including a plurality of hollows having shapes complementary with blisters to be formed on said band by operation of said die, said stationary plate and movable plate being opposed, with each said hollow being aligned with a respective one of said holes;

means for moving said movable plate in a first direction toward said stationary plate and in a second direction away from said stationary plate;

pressure means for flowing pressurized air through said holes, said air being directed toward said hollows;

advancing means for moving said band in steps from said means for preheating to said die and then from said die;

a striker device positioned at the outlet of said pressing station, said striker device including a first bar having a plurality of pins extended therefrom, and means for moving each said pin to respectively enter one of said formed blisters as said movable plate is moved in said first direction, said entered pins being positioned and dimensioned to prevent movement of said band before said movable plate has moved fully toward said stationary plate during operation of said apparatus;

a first jack having a stem for striking against said movable plate to move said movable plate in said first direction; and a pair of auxiliary jacks, said auxiliary jacks acting on said movable plate in a direction opposite to said first jack, simultaneous operation of said jacks when said movable plate is moved in said first direction effecting elastic striking of said stem against said movable plate, said auxiliary jacks moving said movable plate away from said stationary plate after thermoforming said blisters.

7. An apparatus as in claim 6, wherein said means for moving said pins include linkage means for connecting said first bar having said pins to said movable plate, said linkage means moving said first bar to enter said pins into said blisters when said movable plate moves in said first direction and withdrawing said pins when said movable plate moves in said second direction.

* * * * *